United States Patent
Roddy et al.

(10) Patent No.: US 7,057,654 B2
(45) Date of Patent: Jun. 6, 2006

(54) FOUR COLOR IMAGE SENSING APPARATUS

(75) Inventors: James E. Roddy, Rochester, NY (US); Robert J. Zolla, Rochester, NY (US); Nelson A. Blish, Rochester, NY (US); Lou Horvath, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 732 days.

(21) Appl. No.: 10/082,936

(22) Filed: Feb. 26, 2002

(65) Prior Publication Data

US 2003/0160881 A1     Aug. 28, 2003

(51) Int. Cl.
*H04N 3/14* (2006.01)
(52) U.S. Cl. ........................... 348/277; 348/279
(58) Field of Classification Search ............... 348/271, 348/268, 272, 273, 278, 279, 281, 282, 277, 348/60; 358/482, 483
See application file for complete search history.

(56) References Cited

U.S. PATENT DOCUMENTS

| | | | |
|---|---|---|---|
| 3,971,065 A | 7/1976 | Bayer | |
| 4,281,339 A * | 7/1981 | Morishita et al. | 348/236 |
| 4,286,285 A * | 8/1981 | Rhodes | 348/274 |
| 4,404,585 A * | 9/1983 | Hjortzberg | 348/271 |
| 5,063,439 A | 11/1991 | Tabei | |
| 5,251,019 A | 10/1993 | Moorman et al. | |
| 5,379,069 A * | 1/1995 | Tani | 348/333.11 |
| 5,382,976 A * | 1/1995 | Hibbard | 348/273 |
| 5,631,703 A | 5/1997 | Hamilton, Jr. et al. | |
| 5,654,756 A | 8/1997 | Takahashi et al. | |
| 5,677,202 A | 10/1997 | Hawkins et al. | |
| 5,719,074 A | 2/1998 | Hawkins et al. | |
| 5,796,433 A * | 8/1998 | Dyck | 348/311 |
| 5,917,560 A * | 6/1999 | Neumann | 349/8 |
| 5,990,950 A | 11/1999 | Addison | |
| 6,001,668 A | 12/1999 | Anagnostopoulos et al. | |
| 6,181,376 B1 | 1/2001 | Rashkovskiy et al. | |
| 6,191,826 B1 | 2/2001 | Murakami et al. | |
| 6,220,710 B1 | 4/2001 | Raj et al. | |
| 6,256,073 B1 | 7/2001 | Pettitt | |
| 6,330,029 B1 | 12/2001 | Hamilton et al. | |
| 6,373,523 B1 * | 4/2002 | Jang | 348/273 |
| 6,611,289 B1 * | 8/2003 | Yu et al. | 348/265 |

FOREIGN PATENT DOCUMENTS

| | | |
|---|---|---|
| EP | 0 501 718 | 9/1991 |
| EP | 0 634 875 | 1/1995 |
| EP | 0 804 037 | 10/1997 |
| EP | 0 810 795 | 12/1997 |
| WO | 01/95544 A2 | 12/2001 |

* cited by examiner

*Primary Examiner*—Ngoc-Yen Vu
*Assistant Examiner*—Anthony Daniels
(74) *Attorney, Agent, or Firm*—Nelson Adrian Blish (57) ABSTRACT

An imaging camera apparatus (20) for capturing images electronically and providing output data for four separate color channels, red, green, blue, and a fourth saturated primary color, expanding the color gamut over conventional three color channel cameras. An image acquisition unit (120) directs input light to one, two, or four photosensors (30) for obtaining four-color image data.

16 Claims, 6 Drawing Sheets

FOUR COLOR IMAGE SENSING APPARATUS

CROSS REFERENCE TO RELATED APPLICATIONS

Reference is made to commonly-assigned U.S. patent application Ser. No. 10/084,731, filed Feb. 26, 2002, entitled FOUR COLOR FILM WRITER, by Roddy et al., now U.S. Pat. No. 6,762,785, issued Jul. 13, 2004, the disclosure of which is incorporated herein.

FIELD OF THE INVENTION

The present invention relates in general to color imaging apparatus and in particular to electronic cameras employing receptors for four colors to increase the color gamut of the captured image.

BACKGROUND OF THE INVENTION

Recent electronic camera designs typically use planar CCD and CMOS type sensors. In order to provide a succession of color image frames wherein each frame has full color content using these sensor types, one of two approaches is used. In one method, three separate sensor arrays are provided, with either a red, a green, or a blue filter in front of each sensor array. Alternatively, a prism could be used to split incoming light into three colors, with each color provided to a separate, unfiltered sensor array. This first method provides a tristimulus red, green, and blue (RGB) value for each pixel.

A second method uses a single sensor array and places a color filter array (CFA) over the sensor array such that a red, a green, or a blue filter lies over each sensor of the sensor array. With this second method, since the full tristimulus RGB value is not obtained from each sensor of the sensor array, interpolation is used to calculate missing values, based on the matrix of values obtained. The second method has been used for lower resolution sensors, especially for consumer still cameras, so that images obtained on these cameras can be output easily to printing and display devices in standard TIFF or BMP (bitmap) formats. Although the second method may introduce some unwanted effects in an image under certain conditions, this method has the advantage of eliminating color misregistration errors associated with misalignment of multiple sensors and is often used for generating NTSC television signals.

Yet another method is available when using a single sensor, but does not provide simultaneous RGB color content. This third method employs a field sequential camera with a single sensor and a rotating color filter wheel with red, green, and blue filters.

Among patents that describe interpolation techniques used with the second method given above, U.S. Pat. No. 3,971,065 (Bayer) discloses a color imaging array wherein a mosaic of selectively transmissive filters is superimposed in registration with a solid imaging array. In a preferred embodiment, each row contains alternating filters for luminance and a first chrominance and alternating rows contain luminance filters alternating with a second chrominance filter. The advantage of this approach, wherein there are twice as many green pixels as red or blue pixels, is that a higher resolution is obtainable in green, to which the eye is most sensitive. Green sensitivity is also most closely related to the luminance channel value for a color image. As is well known in the imaging arts, the human eye is most sensitive to luminance and much less sensitive to chroma information. Thus, luminance data is important in NTSC color transmission used for color TV, for example. Other examples of interpolation techniques used with digital color cameras that employ CFAs are disclosed in U.S. Pat. No. 5,990,950 (Addison) and U.S. Pat. No. 6,181,376 (Rashkovskiy et al.)

For video camera applications, U.S. Pat. No. 5,251,019 (Moorman et al.) discloses a solid state color image sensor used with a CFA. The color filter array in U.S. Pat. No. 5,251,019 covers an array of image sensor elements wherein 75% of the image sensing elements are luminance sensing, for example, green elements, and the rest are chrominance sensing, for example, red and blue elements.

With the goal of improving image quality, there have been a number of solutions proposed for improving the RGB sensitivity of digital color cameras. As one example, instead of using a color filter array (CFA) of red, green, and blue (RGB) filters, using a filter array of cyan, magenta, and yellow (CMY) filters has been proposed, as noted in U.S. Pat. Nos. 5,631,703 and 6,330,029 (Hamilton et al.) Accurate RGB values can then be derived algebraically from the CMY values. It is further noted in the latter patent as an advantage of such a filter technique that twice the amount of energy falls on each pixel as compared to the RGB color filter array (CFA). For example, cyan transmits both blue and green light, so that the detector cell would see twice as much light as it would with either a blue or a green filter. This advantage provides a better signal to noise ratio for a given cell size and integration time. In a preferred embodiment, because luminance information is derived from the green channel, an additional green filter is also added to the cyan, magenta, and yellow filters to provide a better interpolation of RGB values for each pixel.

In another attempt to improve camera performance with various light sources while minimizing interpolation artifacts, U.S. Pat. No. 5,889,554 (Mutze) discloses the use of five color filters and preferred patterns for arranging them. The preferred colors are B (455 nm), G' (494 nm), G (545 nm), G' (570 nm), and R (595 nm). The extra colors aid in improving the interpolation of RGB values for each pixel; no additional color data is provided.

With the goal of improving CCD sensor performance through device manufacturing techniques, U.S. Pat. No. 6,001,668 (Anagnostopoulos) describes the use of transparent ITO electrodes in sensor fabrication. With a similar goal, U.S. Pat. Nos. 5,677,202 and 5,719,074 (Hawkins et al.) disclose improved methods of manufacturing CFAs onto CCDs.

Figure 10:
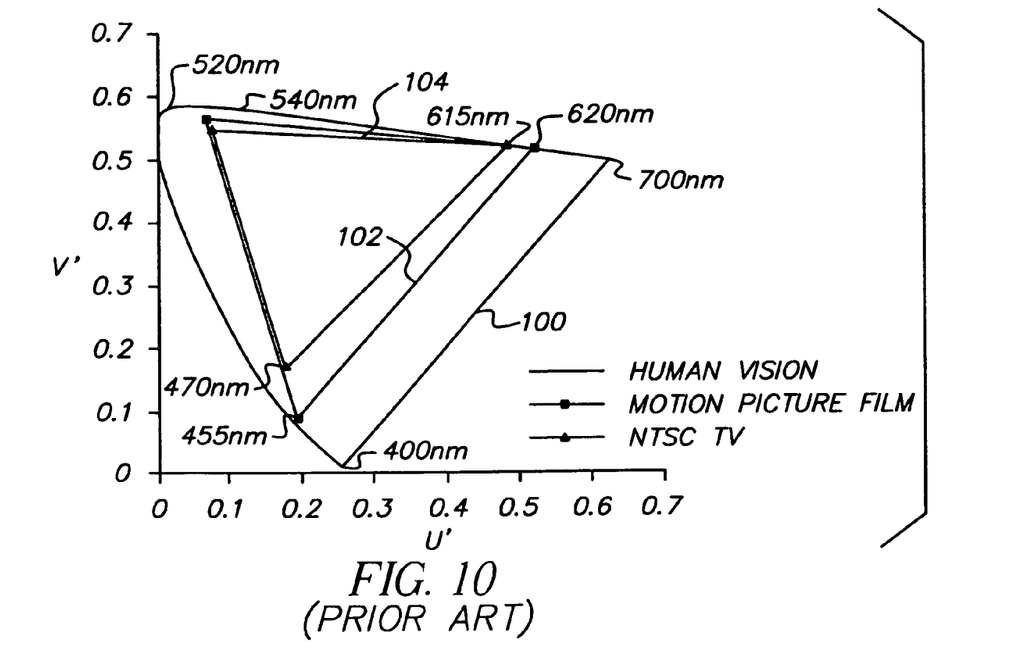
FIG. 10 is a graph showing the conventional color gamut for motion picture film and NTSC TV signals.

The above cited patents show attempts at improving color quality of digital color images by making incremental improvements to the RGB data as acquired and processed by a digital camera. Referring to FIG. 10, there is shown a familiar graphical representation of the human-visible color gamut, shown as a horseshoe-shaped periphery 100. Within periphery 100 are represented two smaller color gamuts: a motion picture film color gamut 102 and an NTSC TV color gamut 104. It is instructive to note that the color gamut is essentially defined by a triangle, where each vertex corresponds to a substantially pure color source, ideally a primary color, that serves as a component color for other colors within the gamut. The area of the triangle thus represented corresponds to the size of the color gamut. To expand color gamut requires moving one or more vertices closer to periphery 100.

Conventional color models, such as the CIE LUV model that follows the color space conventions defined in 1931 by the Commission Internationale de l'Eclairage (International Commission on Illumination), represent each individual color as a point in a 3-dimensional color space, typically using three independent characteristics such as hue, saturation, and brightness, that can be represented in a three-dimensional coordinate space. Color data, such as conventional image data for a pixel displayed on a color CRT, is typically expressed with three-color components (for example R, G, B), that is, in tristimulus form. Conventional color projection film provides images using three photosensitized emulsion layers, sensitive to red, blue, and green illumination. In fact, the human eye itself has three-color sensors, R, G, B. Because of these conventional practices and image representation formats, developers of cameras, films, printing apparatus and display systems have, understandably, adhered to a three-color model.

There have been some attempts to expand from the conventional three-color model in order to represent color in a more accurate, more pleasing manner. Notably, few of these attempts are directed to expanding the color gamut. For example, the printing industry has used a number of strategies for broadening the relatively narrow gamut of pigments used in process-color printing. Because conventional color printing uses light reflected from essentially white paper, the color representation methods for print employ a subtractive color system. Conventionally, the process colors cyan (blue+green), magenta (red+blue) and yellow (red+green) are used for representing a broad range of colors. However, due to the lack of spectral purity of the pigment, combinations of cyan, magenta and yellow are unable to yield black, but instead provide a dark brown hue. To improve the appearance of shadow areas, black is added as a fourth pigment. As is well known in the printing arts, further refined techniques, such as undercolor removal could then be used to take advantage of less expensive black pigments in full-color synthesis. Hence, today's conventional color printing uses the four color Cyan, Magenta, Yellow, and blacK (CMYK) method described above. However, even with the addition of black, the range of colors that can be represented by printing pigments is limited.

Other examples showing where additional color components have been added to improve color appearance are from digital projection apparatus. U.S. Pat. No. 6,256,073 (Pettit) discloses a projection apparatus using a filter wheel arrangement that provides four colors in order to maintain brightness and white point purity. However, the fourth color added in this configuration is not spectrally pure, but is white in order to add brightness to the display and to minimize any objectionable color tint. It must be noted that white is an "intra-gamut" color addition; in terms of color theory, adding white actually reduces the color gamut by desaturating the color. Similarly, U.S. Pat. No. 6,220,710 (Raj et al.) discloses the addition of a white light channel to standard R, G, B light channels in a projection apparatus. As was just noted, the addition of white light may provide added luminosity, but constricts the color gamut. U.S. Pat. No. 6,191,826 (Murakami et al.) discloses a projector apparatus that uses four colors derived from a single white light source, where the addition of a fourth color, orange, compensates for unwanted effects of spectral distribution that affect the primary green color path. Again, the approach disclosed in the Murakami patent does not expand color gamut and may actually reduce the gamut.

Unlike the earlier patents listed above for projection apparatus, Patent Application WO 01/95544 A2 (Ben-David et al.) discloses a display device and method for color gamut expansion using four or more primary colors. However, while the methods and apparatus disclosed in application WO 01/95544 provide improved color gamut for projected images, the image data that is originally input to the projection device is tristimulus RGB data, not four-color data.

Thus, it can be seen that it would be advantageous to provide a camera which could provide a signal having a fourth color that would result in an improved color gamut. Such a signal could be input to a projector mechanism or printing device that could take advantage of this extended gamut and provide a more pleasing image.

SUMMARY OF THE INVENTION

It is an object of the present invention to provide the widest gamut input data to four color cinema, television display, or four color writer. A four-color capture of the input scene is desirable.

Briefly, according to the present invention a color image device comprises an array of sensitive light elements. A first type of element is sensitive to a blue spectral region. A second type of element is sensitive to a red spectral region. A third type of element is sensitive to a green spectral region. A fourth type of element is sensitive to a fourth portion of the spectral region.

In the present invention, capture could be done using existing CCD or CMOS imagers. One method is to have four cameras, each with a separate spectral filter in front of it. A second method is to have a rotating filter wheel in front of a single camera that has four spectral bandpass filters. A third method is to have four sensors in a camera, and spectrally separate the light with dichroic filters. In a fourth method, a CCD or CMOS sensor with an integral four color filter array, similar to the three color filter arrays in present use, would provide a suitable solution. Present color filter arrays (CFA) are provided for RGB operation or for the light-efficient CMY operation, and could be suitably modified to incorporate a fourth passband.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
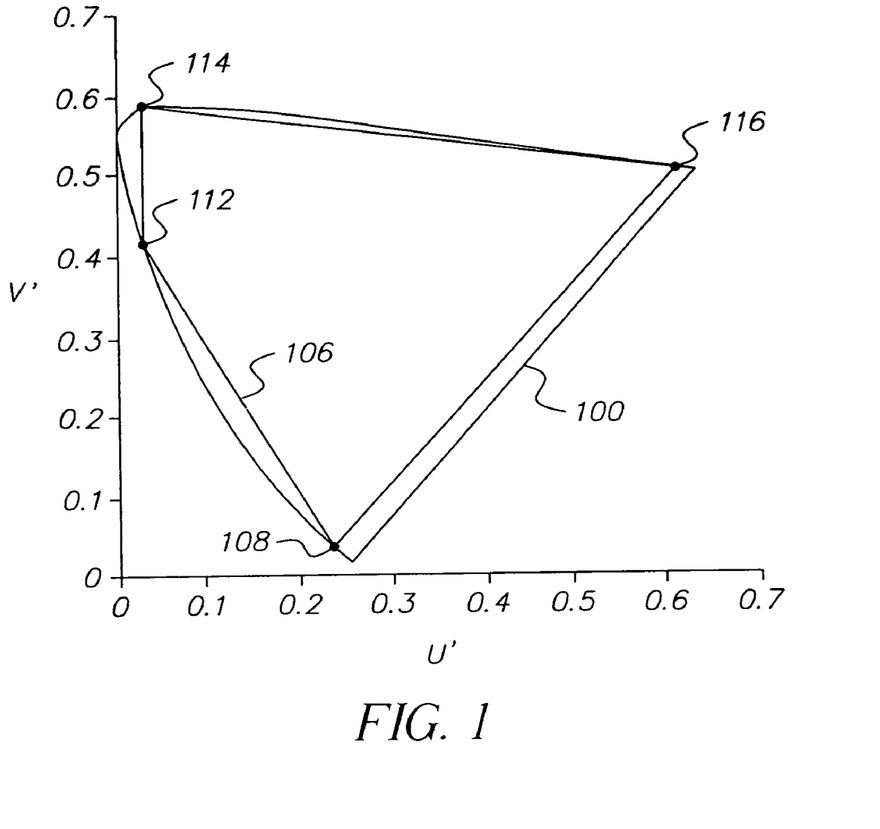
FIG. 1 is a graph which shows the color gamut available from a four color projector using input signals from a four color camera.

Referring now to FIG. 1, there is shown a CIE chromaticity diagram in u', v' coordinate space wherein horseshoe shaped periphery 100 shows the limits of gamut defined by human color vision. Note that a four sided polygon 106 defined by the four vertices 116, 114, 112, 108 of red, green, blue, and blue-green saturated primary colors encompasses a color gamut almost equal to that of the human visual system. A display using four light sources would be capable of forming images using this enhanced color gamut, and providing a more faithful reproduction of an original scene, but it optimally requires a fourth color signal that is not available with conventional camera devices. Simply stated, a four-color display requires a four-color camera.

In order to provide fourth color scene information, for example, blue-green, to a blue-green color modulator, it is desirable to record a separate color channel in the camera which captures the scene. This requires a camera that captures red, green, blue, and a fourth primary color C (RGBC) where C is typically blue-green or cyan. The cyan information described here can be of narrower spectral bandwidth than that transmitted by a typical cyan filter, which covers all of the blue and all of the green spectral region. Such a camera could have a number of different possible arrangements, for example, with four sensors, one sensor for each color, with two sensors, each sensor shared by two colors, or with a single sensor having a color filter array for which an R, G, B, C, value could be determined for each pixel location, or with a single high resolution sensor with a four color CFA that outputs data to four color channels.

Figure 2:
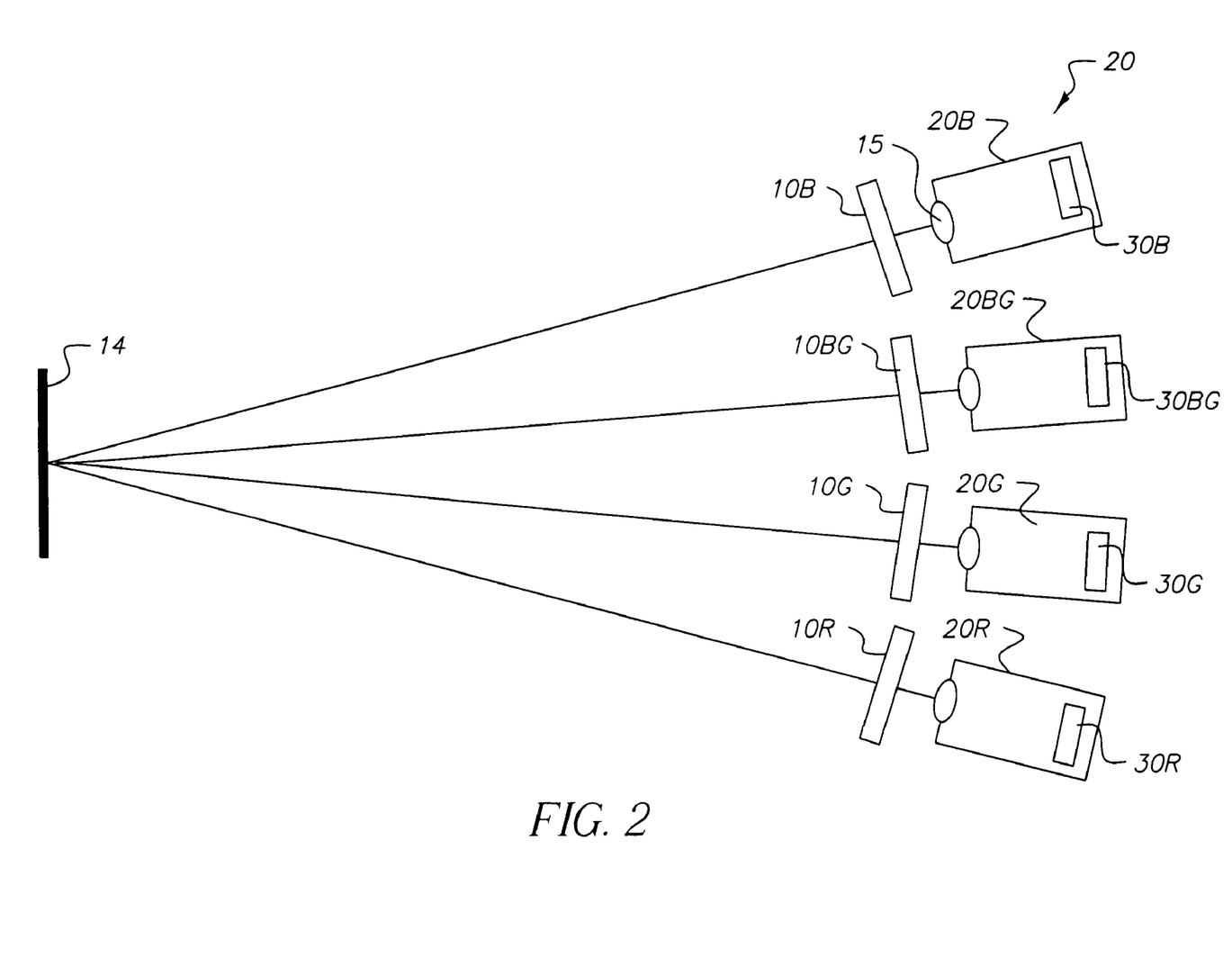
FIG. 2 is a top view of a four camera, four filter system.

One method of providing RGBC data is shown in the embodiment of FIG. 2. Four cameras 20R, 20G, 20BG, and 20B are aligned to a scene 14, each camera having a separate color filter 10R, 10G, 10BG, 10B respectively, positioned in front of it. A lens 15 images scene 14 onto an appropriate area array photosensor 30R, 30G, 30BG, 30B. The advantage of this arrangement is high resolution imaging in each color, R, G, B, C. A difficulty with this arrangement, in addition to cost, is the task of keeping all four cameras registered.

Figure 3:
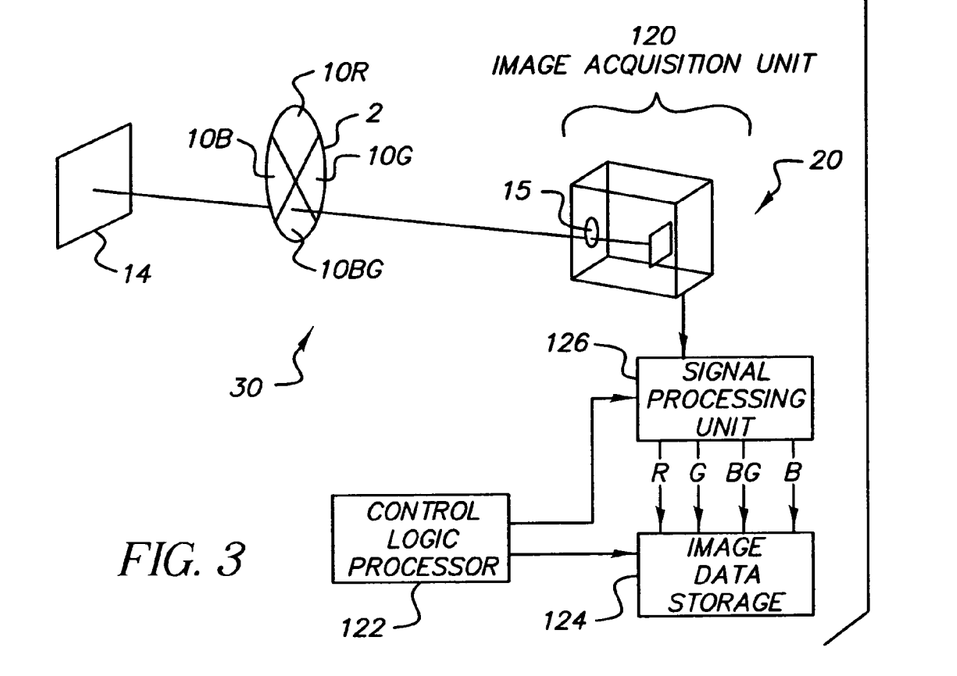
FIG. 3 shows a camera using a field sequential single sensor with a rotating filter wheel.

A second embodiment is shown in FIG. 3, wherein a single camera 20 with a single area array photosensor 30 is used with a color filter wheel 25 containing red 10R, green 10G, blue-green 10BG, and blue 10B filters positioned in front of the camera and a color sequential signal produced. Color filter wheel 25 can be replaced by an electronically switchable LCD color filter such as devices made by ColorLink Inc., Boulder, Colo. This type of color filter is typically operated between crossed polarizers (not shown).

Referring again to FIG. 3, camera 20 comprises an image acquisition unit 120 that contains the optical and electronic components for focus, sensing, and initial light acquisition. A signal processing unit 126 accepts and processes the sensed data values from photosensor 30. For the apparatus shown in FIG. 3, signal processing unit 126 processes the sequential color data that is output from imaging acquisition unit 120. A control logic processor 122, typically a microprocessor or equivalent logic processing device, coordinates and controls the acquisition of image data and the interaction of image acquisition unit 120 and signal processing unit 126. An image data storage device 124 stores the final four-color data that is obtained for each image pixel.

Figure 4:
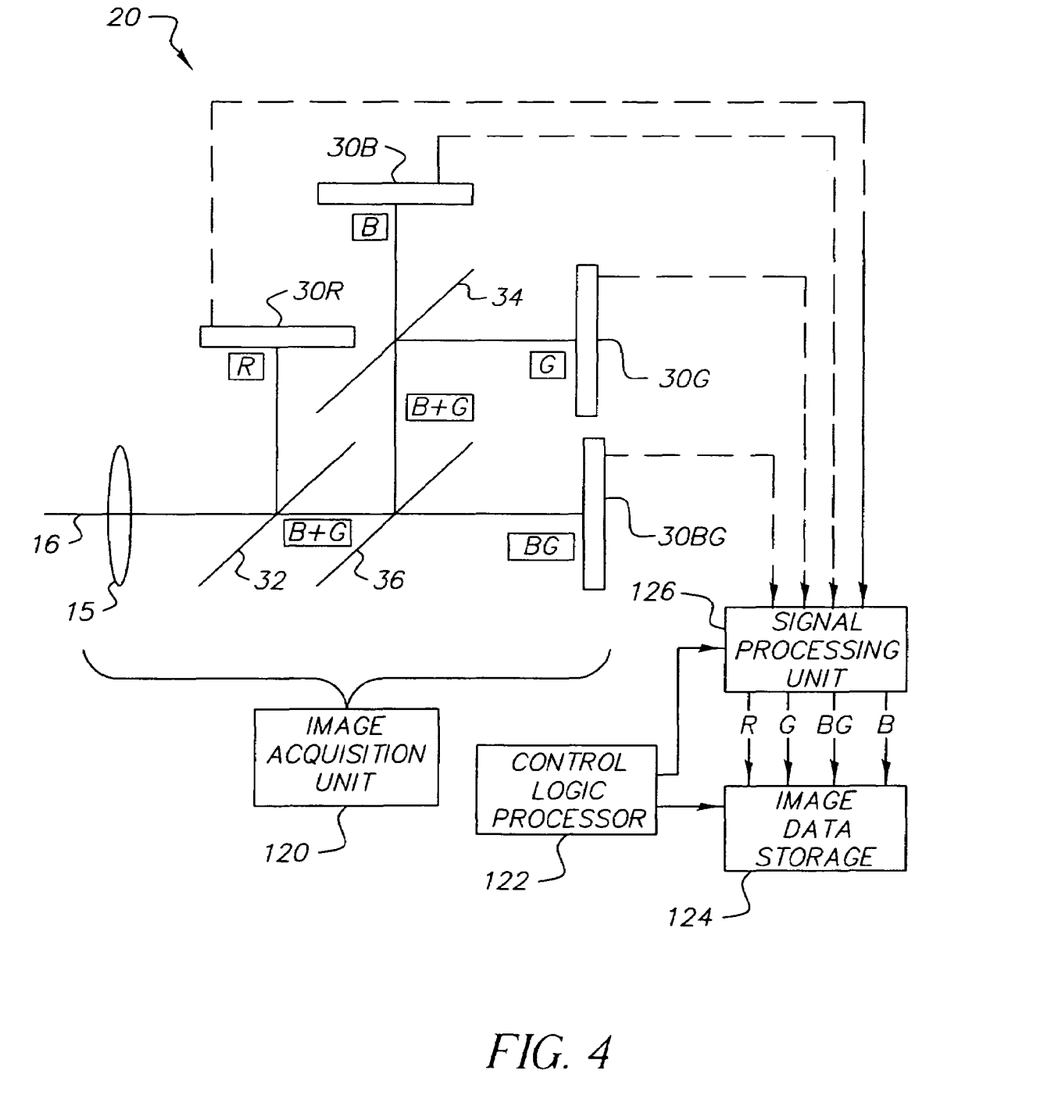
FIG. 4 is a top view schematic of a 4 sensor camera with dichroic filter spectral bandwidth separators.

A third embodiment is shown in FIG. 4, wherein camera 20 has four area array photosensors 30, and white light 16 from a scene is spectrally divided for the four sensors 30R, 30G, 30BG, 30B, one each for red, green, blue-green, and blue. White light 16 passes through lens 15, and is divided by a dichroic mirror 32 into red light and blue-green light. The red light, in this case, reflects from dichroic mirror 32 and impinges onto CCD array 30R. The blue, green, and blue-green light is transmitted to a beamsplitter 36, which could be a pellicle or partially silvered mirror, for example. Beamsplitter 36 does not have to divide the light equally. For example, two-thirds of the light could be directed to the blue sensor and the green sensor and one-third of the light could be directed to the blue-green sensor. Blue and green light are reflected from beamsplitter 36 and directed toward a dichroic mirror 34. Blue-green light is transmitted through beamsplitter 36 and goes to blue-green area array photosensor 30BG. Dichroic mirror 34 then transmits blue light to blue area array photosensor 30B and reflects green light to green area array photosensor 30G. It is instructive to note that each photosensor 30 can be separately tuned to a suitable sensitivity value for the level of incident light.

Figure 5:
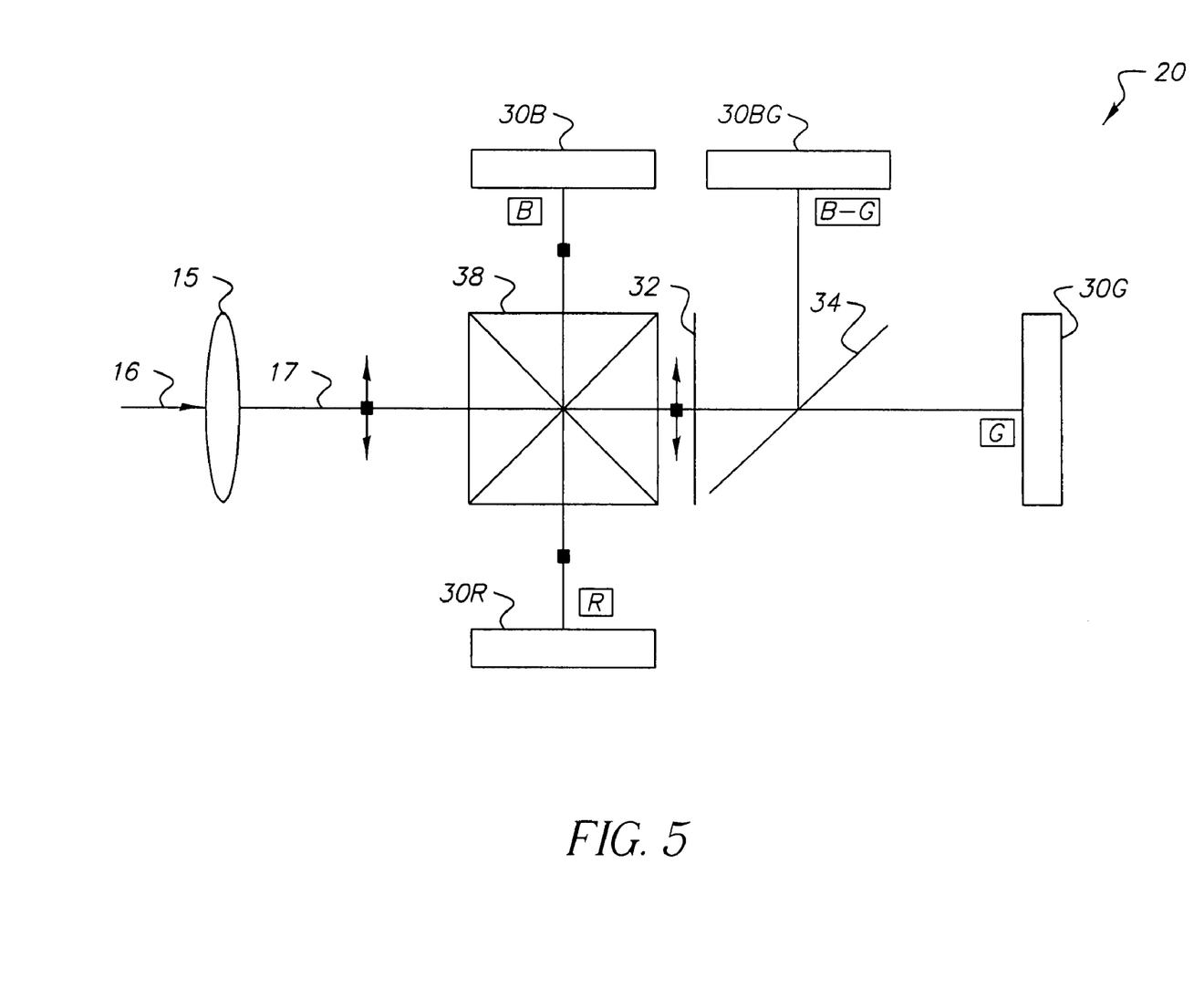
FIG. 5 is a top view schematic of a 4 sensor camera with an x-cube color splitter.

A fourth embodiment is shown in FIG. 5, wherein an X-cube 38 is used to separate the s-polarized red and blue colors (denoted by the dots) from the incoming light from lens 15. A filter 32 reflects red, blocking red light that may leak through X-cube 38 and passes blue and green. A dichroic mirror 34 is used to complete and clean up the color separation. The x-cube passes green of both polarizations (as shown by the dot and the arrow) and will also pass s-polarized (arrow) blue and red light. Dichroic filter 34 is designed to reflect the remainder of the blue and the shorter wavelengths of the green light to blue-green sensor 30BG. The balance of the green light is transmitted to green sensor 30G.

Figure 6:
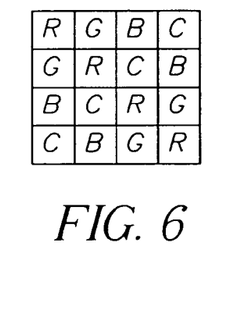
FIG. 6 shows an arrangement of RGCB filters in a color filter array.

FIG. 6 shows a preferred arrangement of RGBC filters in a color filter array. In one embodiment, fourth color C is cyan, the blue-green filter that can have a narrower bandwidth than the full blue and green spectra, which ranges from the 400 to 600 nm normally be associated with cyan. For example, a suitable cyan filter may have a passband of 470 to 530 nm. The green and blue-green filters can be used to represent the luminance signal, and are alternated with red and blue. In this way, the "luminance" signal will have higher resolution than the red and blue "chrominance" signals. The filters are arranged in a manner similar to that shown in U.S. Pat. Nos. 5,631,703 and 6,330,029 so that interpolation is improved and that good resolution is maintained in the diagonal direction, as well as vertical and horizontal directions. Such a sensor can be incorporated in a camera similar to that illustrated in FIG. 9.

Figure 7A:
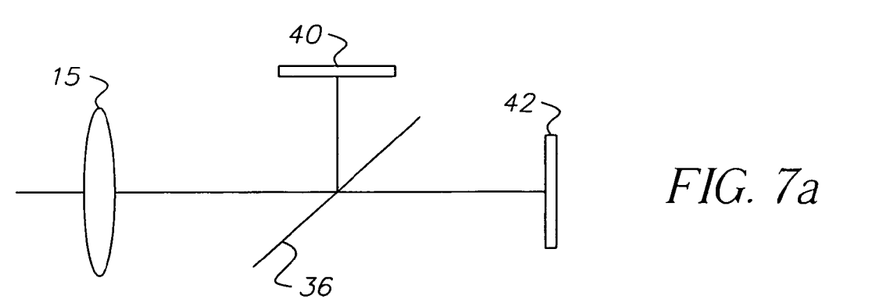
FIG. 7a shows a camera with 2 sensors, one with a G, C filter array and one with a R, B filter array.

FIG. 7a shows image acquisition unit 120 in camera 20 which uses two area array photosensors 40, 42, each with a separate color filter array. Here, array photosensor 42 has a combination of G and C filters and can be used directly as the luminance signal because the eye is most sensitive to these wavelengths. The other sensor, array photosensor 40 has R and B filters. The light entering the camera passes through lens 15 and is imaged on one of the two array photosensors 40, 42. Some of the light is transmitted by beamsplitter 36 and is imaged onto the array photo 42 sensor having a green and blue-green color filter array. The remainder of the light is reflected to array photosensor 40 having a red and blue color filter array. Beamsplitter 36 can be a mirror, pellicle, or a dichroic mirror. A dichroic device may be more expensive but has the advantage of light efficiency and possibly improved contrast. Beamsplitter need not be 50—50 with reflect to reflected versus transmitted light. More light could be directed to one detector or the other to compensate for detector response.

A hybrid design for camera 20 with two area array photosensors as shown in FIG. 7*a* is a compromise between the four sensor camera of FIGS. 4 and 5 which is harder to align but needs no interpolation and a single sensor camera as in FIG. 3 which is much easier to align but is neither as accurate in color rendition nor as high in resolution. However, the two array camera can be more compact and less expensive than the four color device and does not require expensive prisms or dichroic components.

Figure 8A:
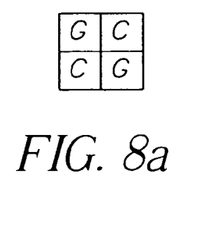
FIG. 8a shows an arrangement of G and C filters in an array.
Figure 8B:
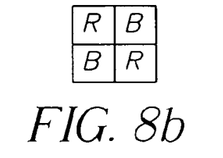
FIG. 8b shows an arrangement of R and B filters in an array.

FIG. 8*a* shows a preferred arrangement of G and B–G filters in a CFA for use in a camera illustrated in FIG. 7*a*. FIG. 8*b* shows a preferred arrangement of R and B filters in a CFA for use in a camera illustrated in FIG. 7*a*.

Figure 7B:
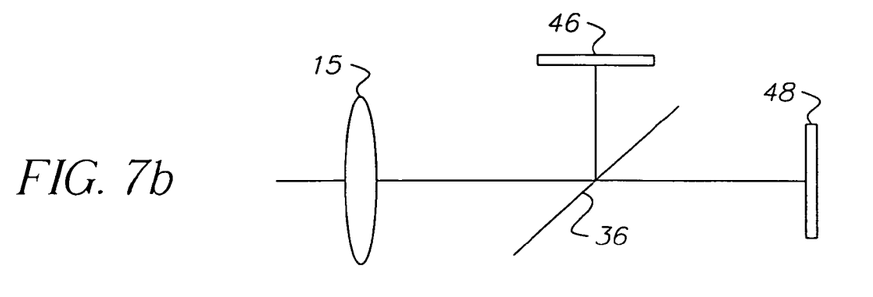
FIG. 7b shows a camera with 2 sensors, one with a R, G filter array and one with a C, B array.

In comparison with FIG. 7*a*, FIG. 7*b* shows image acquisition unit 120 having R and G filters on area array photosensor 46 and C and B filters on area array photosensor 48, grouping the filters by closest wavelength. This arrangement may be the most advantageous with respect to dichroic beamsplitter 36 design, since all wavelengths above a threshold are reflected, and all wavelengths below the threshold are transmitted. In contrast, the arrangement of FIG. 7*a* transmitted wavelengths toward the middle of the visible spectrum, reflecting higher and lower wavelengths. FIG. 7*a* would thus be optimal for an imaging system such as NTSC using luminance information. It should be noted that the colors reflected and the colors transmitted shown in FIGS. 7*a* and 7*b* could be reversed. Not all imaging systems require a TV style signal based on luminance and chrominance. Where broadcast bandwidth is not an issue, as with digital cinema projectors and color printers, the R, G, C, B signals can be used directly.

Figure 8C:
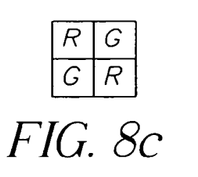
FIG. 8c shows an arrangement of R and G filters in an array.
Figure 8D:
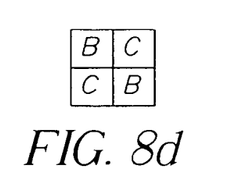
FIG. 8d shows an arrangement of B and C filters in an array.

The filter arrays needed for the camera illustrated in FIG. 7*b* are constructed as shown in FIGS. 8*c* and 8*d*.

Figure 9:
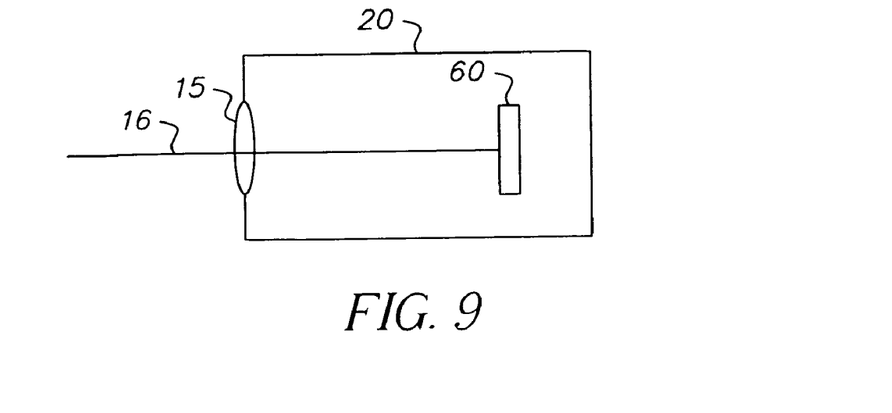
FIG. 9 is a top view of a camera with a single photosensor having a multicolor CFA.

FIG. 9 shows an alternate embodiment of camera 20 where imaging lens 15 images light from scene 14 (not shown in FIG. 9) onto a multicolor color filter array photosensor 60. Photosensor 60 might use an array configured as that shown in FIG. 6 as an RGBC CFA. It could have any of a number of other configurations including a CMY array. The red, green and blue signals can be derived algebraically from the CMY signals and the blue-green signal can use a scaled version of the cyan signal.

Deriving RGBC from CMY filter signals:

$R = M + Y$ $G = C + Y$ $B = C + M$ $BG = C$

These signals are then combined electronically in the signal processing unit 126 to provide a four color image, which has an increased color gamut.

Another filter that be used in the camera of FIG. 9 is a variation of the Moorman filter. The Moorman filter is arranged as follows:

$$\begin{matrix} G & G & G & R \\ G & R & G & G \\ G & G & G & B \\ G & B & G & G \end{matrix}$$

Some of the G filters can be replaced with a C filter which represents blue-green, for example:

$$\begin{matrix} G & C & G & R \\ G & R & G & C \\ G & G & C & B \\ C & B & G & G \end{matrix}$$

Rearranging for better diagonal response:

$$\begin{matrix} C & R & G & G \\ G & C & G & B \\ G & G & C & R \\ B & G & G & C \end{matrix}$$

For processing of data obtained from CFA filtering for four colors and interpolation of color values, methods similar to those presently used with three-color systems can be employed.

The invention has been described in detail with particular reference to certain preferred embodiments thereof, but it will be understood that variations and modifications can be effected within the scope of the invention.

PARTS LIST

| | |
|---|---|
| 10R. | Red filter |
| 10G. | Green filter |
| 10BG. | Blue-Green filter |
| 10B. | Blue filter |
| 14. | Scene or object |
| 15. | Lens |
| 16. | White light |
| 20. | Camera |
| 20R. | Red channel camera |
| 20G. | Green channel camera |
| 20BG. | Blue-Green channel camera |
| 20B. | Blue channel camera |
| 25. | Color filter wheel |
| 30. | Area array photosensor |
| 30R. | Red area array photosensor |
| 30G. | Green area array photosensor |
| 30BG. | Blue-Green area array photosensor |
| 30B. | Blue area array photosensor |
| 32. | Dichroic filter |
| 34. | Dichroic mirror |
| 36. | Beamsplitter |
| 38. | X-cube beamsplitter |
| 40. | Area array photosensor with red and blue color filter array |
| 42. | Area array photosensor with green and blue-green color filter array |
| 46. | Area array photosensor with red and green color filter array |
| 48. | Area array photosensor with blue and blue-green color filter |

-continued

| | array |
|---|---|
| 60. | Area array photosensor with multicolor color filter array |
| 100. | Color gamut of human eye |
| 102. | Motion picture film color gamut |
| 104. | NTSC TV color gamut |
| 106. | Four sided polygon |
| 108. | Blue polygon vertex, 442 nm |
| 112. | Blue-green polygon vertex, 488 nm |
| 114. | Green polygon vertex, 515 nm |
| 116. | Red polygon vertex, 649 nm |
| 120. | Image acquisition unit |
| 122. | Control logic processor |
| 124. | Image data storage unit |
| 126. | Signal processing unit |

What is claimed is:

1. A color imaging device comprising an array of light sensitive elements:
a first type of element sensitive to a blue spectral region;
a second type of element sensitive to a red spectral region;
a third type of element sensitive to a green spectral region;
a fourth type of element sensitive to a blue-green portion of said spectral region; and
wherein the blue, green, and blue-green spectral region are substantially non-overlapping.

2. A color imaging device as in claim 1 wherein said light sensitive elements are comprised of a photosensor and a transmissive color filter.

3. A color image sensor comprising:
a substantially planar array of solid state light sensitive elements; and
a filter mosaic made up of individual filter elements which are superposed in one-to-one registry on said light sensitive elements, such mosaic being comprised of:
a first type of filter element transparent to green;
a second type of filter element transparent to red;
a third type of filter element transparent to blue;
a fourth type of filter element transparent to blue-green; and
wherein such filter elements are arranged in repeating patterns in two perpendicular directions throughout substantially the entire imaging area of the sensor.

4. A color imaging device as in claim 3 wherein said pattern is:

$$\begin{array}{cccc} R & G & B & B-G \\ G & R & B-G & B \\ B & B-G & R & G \\ B-G & B & G & R. \end{array}$$

5. A color imaging device comprising:
a first digital camera comprising a first sensor array and a first color filter for filtering all light except light associated with a red spectral region;
a second digital camera comprising a second sensor array and a second color filter excluding all light except that associated with a green spectral region;
a third digital camera comprising a third sensor array and a third color filter for filtering all light except light associated with a blue-green spectral region; and
a fourth digital camera comprising a fourth sensor array and a fourth color filter for filtering all light except light associated with a blue spectral region.

6. A color imaging device comprising an array of light sensitive elements:
a first type of element sensitive to a cyan spectral region;
a second type of element sensitive to a magenta spectral region;
a third type of element sensitive to a yellow spectral region;
a signal processing unit which calculate a red, green, blue, and blue-green value from signals to said signal processor from said first, second, and third element.

7. A color imaging device as in claim 6 wherein said light sensitive elements are comprised of a photosensor and a transmissive color filter.

8. A color imaging device as in claim 7 wherein said transmissive color filter for said cyan spectral region is between 400 and 600nm.

9. A color imaging device as in claim 7 wherein said transmissive color filter for said magenta spectral region is between 400 to 500 nm and 600 to 700nm.

10. A color imaging device as in claim 7 wherein said transmissive color filter for said yellow spectral region is between 500 to 700nm.

11. A color imaging device as in claim 6 wherein said red value is calculated from magenta and yellow.

12. A color imaging device as in claim 6 wherein said green value is calculated from cyan and yellow.

13. A color imaging device as in claim 6 wherein said blue value is calculated from cyan and magenta.

14. A color imaging device as in claim 6 wherein said blue-green value is calculated from cyan.

15. A color imaging device comprising an array of light sensitive elements:
a first type of element sensitive to a blue (B) spectral region;
a second type of element sensitive to a red (R) spectral region;
a third type of element sensitive to a green (G) spectral region;
a fourth type of element sensitive to a cyan (C) portion of said spectral region;
wherein said light sensitive elements are comprised of a photosensor and a transmissive color filter; and
wherein said transmissive color filter are arranged in a pattern of:

$$\begin{array}{cccc} R & G & B & C \\ G & R & C & B \\ B & C & R & G \\ C & B & G & R. \end{array}$$

16. A color imaging device as in claim 15 wherein the spectral range of said cyan is 470 to 530 nm.

* * * * *